United States Patent [19]
Erickson

[11] Patent Number: 5,970,142
[45] Date of Patent: Oct. 19, 1999

[54] CONFIGURATION STREAM ENCRYPTION

[75] Inventor: Charles R. Erickson, Fremont, Calif.

[73] Assignee: Xilinx, Inc., San Jose, Calif.

[21] Appl. No.: 08/703,117

[22] Filed: Aug. 26, 1996

[51] Int. Cl.[6] .................................................. H04L 9/00
[52] U.S. Cl. .................................. 380/21; 380/48; 380/4
[58] Field of Search ................................. 380/21, 49, 4, 380/44, 46, 48

[56] References Cited

U.S. PATENT DOCUMENTS

| | | | |
|---|---|---|---|
| 5,081,675 | 1/1992 | Kittirutsunetorn | 380/4 |
| 5,349,249 | 9/1994 | Chiang et al. | 307/465 |
| 5,388,157 | 2/1995 | Austin | 380/4 |
| 5,406,627 | 4/1995 | Thompson et al. | 380/20 |
| 5,748,734 | 5/1998 | Mizikovsky | 380/21 |

OTHER PUBLICATIONS

"The Programmable Logic Data Book," pp. 2–25 through 2–46, Xilinx, 1994, San Jose, California.
Datasheet for the XC5200 FPGA from Xilinx.

*Primary Examiner*—Gail O. Hayes
*Assistant Examiner*—Carmen White
*Attorney, Agent, or Firm*—Edel M. Young; Adam H. Tachner; Philip M. Shaw, Jr.

[57] ABSTRACT

A method of communicating encrypted configuration data between a programmable logic device (PLD) and a storage device is included in one part of the invention. The method includes the following steps. Transmit encrypted configuration data stored in a storage device to the PLD. Decrypt the encrypted configuration data to generate a copy of the configuration data in the PLD. Configure the PLD using the copy of the configuration data. In one embodiment, the PLD transmits a key to the storage device. In another embodiment the key is separately entered into the storage device and the PLD and never transmitted between the PLD and the storage device. In another embodiment, the key is entered only into the PLD. The key is used to encrypt the configuration data.

12 Claims, 3 Drawing Sheets

CONFIGURATION STREAM ENCRYPTION

BACKGROUND OF THE INVENTION

1. Field of the Invention

This invention relates to the field of circuit design. In particular, the invention relates to a method and apparatus for securing data used to configure a programmable logic device.

2. Background Information

Programmable Logic Devices (PLDs) are a class of devices that allow a user to program a device to perform the function of a particular circuit. Examples of PLDs are FPGAs (Field Programmable Gate Arrays) and EPLDs (Erasable Programmable Logic Devices).

To use a PLD, a user captures a circuit design using any of several design capture tools. The user then uses software tools to convert the captured design into a device specific bitwise representation. The bitwise representation is stored in a storage device, such as an EPROM. Upon startup, the storage device supplies the bitwise representation to the PLD, thereby enabling the PLD to perform the function of the circuit design. The PLD, having read in the bitwise representation, then performs the function of the circuit design.

By the time the bitwise representation is created, significant amounts of time and effort have been expended. To encourage individuals and companies to continue to invest in the research and development of new circuit designs, it is desirable to provide some method of protecting the circuit designs from illegal copying and use.

To make an illegal copy of the circuit design, as implemented in the programmable logic device, one need only make a copy of the bitwise representation stored in the storage device. The copied bitwise representation can then be illegally used with other programmable logic devices. Therefore, it is desirable to make it more difficult to copy the bitwise representation of the circuit design.

Additionally, some types of PLDs support multiple configuration modes. For example, the XC4000™ series FPGAs, available from Xilinx, Inc. of San Jose, Calif., supports multiple configuration modes. The 1994 Xilinx Data Book, page 2-25 through page 2-46, describes the unsecured configuration modes for the XC4000™ FPGA product family. Therefore, it is desirable to have secure configuration of PLDs that have multiple configuration modes. Of course no system can be absolutely secure from all potential unauthorized access, therefore, the term "secure" is used to mean more secure than systems without any security.

Some PLDs can be chained together for the purpose of configuration. After one PLD is configured, the configuration data is passed to the next PLD in the chain. Therefore, it is desirable to support the secured configuration of multiple chained PLDs.

SUMMARY OF THE INVENTION

A method of communicating encrypted configuration data between a programmable logic device (PLD) and a storage device according to the invention comprises the steps of storing original configuration data for the PLD in the storage device; in the PLD, pseudo-randomly generating a key; transmitting the key from the PLD to the storage device; in the storage device, from the original configuration data stored in the storage device, generating encrypted configuration data using the key; transmitting the encrypted configuration data from the storage device to the PLD; in the PLD, using the key, decrypting the encrypted configuration data to generate a copy of the original configuration data; and using the original configuration data produced by the decrypting step, configuring the PLD.

A modification of this method includes the additional steps of pseudo-randomly generating and then transmitting a second key from the PLD to the storage device at a second time; in the storage device, with the second key, generating additional encrypted data from the original configuration data stored in the storage device, transmitting the additional encrypted data from the storage device to the PLD; in the PLD, with the second key, decrypting the additional encrypted data to generate additional original configuration data; and, with the additional original configuration data produced by the second decrypting step, configuring the PLD.

A programmable logic device (PLD) and apparatus for programming the PLD according to the invention comprises (1) a storage device external to the PLD, the data storage device including a configuration data storage memory in which original configuration data for configuring the PLD is stored, and (2) an encryption circuit for encrypting the original configuration data stored in the configuration data storage memory in response to a key received from the PLD and transmitting encrypted configuration data to the PLD. The PLD includes (1) a plurality of configurable logic elements programmable with the configuration data to perform one or more functions of a desired circuit design, and (2) a security circuit. The security circuit includes (a) a key generator for both pseudo-randomly generating a key and transmitting the key to the encryption circuit in response to an instruction to configure the PLD, and (b) a decryption circuit for re-generating the original configuration data, coupled to receive (i) the key from the key generator and (ii) the encrypted configuration data from the encryption circuit. The decryption circuit has a configuration data output coupled to program the plurality of configurable logic elements with the original configuration data in response to receiving the encrypted configuration data.

In a modification of this embodiment, the PLD is a field programmable gate array and the configurable logic elements include a plurality of configurable logic blocks and a plurality of configurable input/output blocks.

Although many details have been included in the description and the figures, the invention is defined by the scope of the claims. Only limitations found in those claims apply to the invention.

BRIEF DESCRIPTION OF THE DRAWINGS

The figures illustrate the invention by way of example, and not limitation. Like references indicate similar elements.

DETAILED DESCRIPTION OF THE DRAWINGS

Secure Programmable Logic Device System

Figure 1:
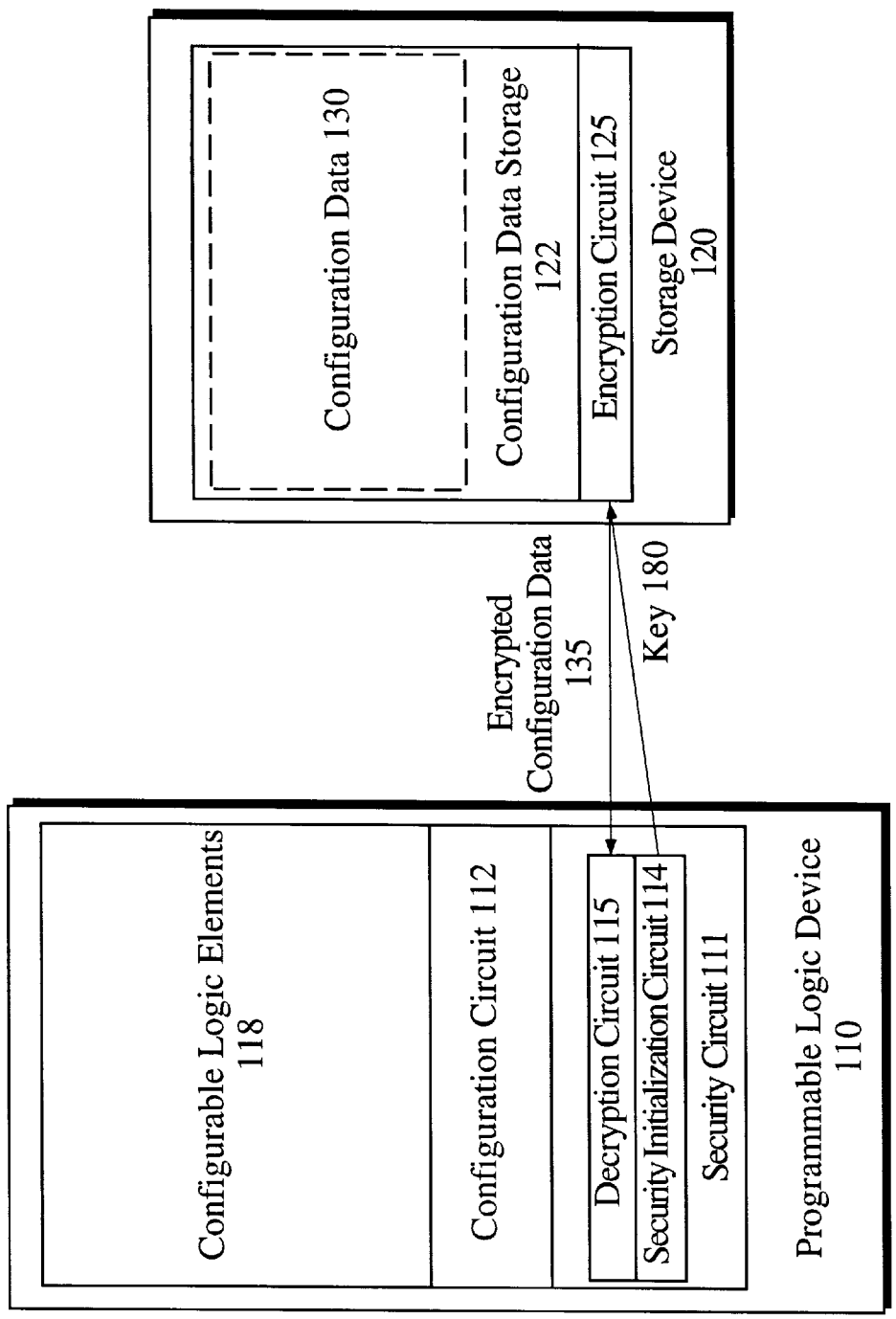
FIG. 1 illustrates a programmable logic device and storage device having security circuits.

FIG. 1 illustrates a programmable logic device (PLD) and storage device having security circuits. In one embodiment of the invention, the PLD provides the storage device with a pseudo-randomly generated key. The storage device then encrypts the bitwise configuration data before transmitting the configuration data to the PLD. Using the key, the PLD then decrypts the configuration data prior to using the configuration data.

The following paragraph identifies the elements of FIG. 1 and how the elements are connected. FIG. 1 includes a PLD 110 and a storage device 120. The PLD 110 includes the following elements: a security circuit 111; a configuration circuit 112; and a number of configurable logic elements 118. The security circuit 111 includes a security initialization circuit 114 and a decryption circuit 115. The storage device 120 includes an encryption circuit 125. The security circuit 111 connects to the input of the encryption circuit 125. The encryption circuit 125 connects to the decryption circuit 115. The storage device 120 also includes a configuration data storage unit 122. The configuration data storage unit 122 stores the configuration data 130. The configuration data 130 includes the bitwise representation of the circuit design, as that circuit design is to be implemented by the PLD 110. The configuration data 130 is what is protected by one embodiment of the invention.

In one embodiment of the invention, the configurable logic elements 118 are programmed as follows. First, the PLD 110 waits until the power supply becomes stable at a predetermined voltage (e.g., at 3.5 volts). Next, a power-on reset step resets some devices in the PLD 110. Next, the configurable logic elements 118 are reset. Then, the security initialization circuit 114 generates a pseudo-random digital key 180. In one embodiment, the key 180 is a string of 0's and 1's eight bits long, not all 1's or all 0's. The key 180 is communicated to the encryption circuit 125. The encryption circuit 125 then uses the key 180 to generate the encrypted configuration data 135 from the configuration data 130. The storage device 120 transmits the encrypted configuration data 135 to the decryption circuit 115. The decryption circuit 115 uses the key 180 from the security initialization circuit 114 to decrypt the encrypted configuration data 135 to generate the configuration data 130. The configuration data 130 is then fed to the configuration circuit 112. The configuration circuit 112 uses the configuration data 130 to program the configurable logic elements 118. Importantly, because the PLD 110 generates the pseudo-random key 180 each time it is programmed, and the key 180 is used to encrypt the configuration data 130, it is ineffective for a person to copy the encrypted configuration data 135 because the encrypted configuration data 135 will be different each time the PLD is configured. To copy the configuration data 130, a person must copy the encrypted configuration data 135, must know the key 180, and must know the technique used to encrypt the encrypted configuration data 135.

The following paragraphs describe the elements of FIG. 1 in greater detail.

The configurable logic elements 118 perform the functions of the circuit design. In one embodiment of the invention, the configurable logic elements 118 include configurable logic blocks and configurable input/output blocks similar to those in the XC4000™ series FPGAs. The configuration data 130, in one embodiment, includes a bitwise representation of the circuit design as implemented in a specific XC4000 series FPGA. In one embodiment, the XACT Step™ software tools generate the bitwise representation. Other embodiments of the invention include other PLDs (e.g., XC5200™ FPGA, also available from Xilinx, Inc., FLEX8000™ available from Altera, Inc., of San Jose, Calif.) and use other tools to generate the configuration data 130 (e.g., Max+Plus II™).

The configuration circuit 112 controls the storage of the configurable logic elements 118 and the operation of the security circuit 111. The configuration circuit 112 also enables the storage of daisy chained PLDs 110. The decryption circuit 115 decrypts the encrypted configuration data 135 using the key 180 and the initialization data 202 and supplies the decrypted configuration data 130 to the configuration circuit 112. Analogously, the encryption circuit 125 encrypts data received from the configuration data storage unit 122 to generate the encrypted configuration data 135. The decryption circuit 115 and the encryption circuit 125 are described in greater detail below.

The security circuit 111 generates keys 180 for use in the encryption process. The use of the keys 180 provide improved security over one embodiment of the invention. In this alternate embodiment of the invention, the configuration data 130 is encrypted by the software used to generate the configuration data 130, e.g., the configuration data 130 is encrypted by an extension to the XACT Step tools. The encrypted configuration data 135 is then stored in the storage device 120. Thus, in a preferred embodiment, at least one pseudo-random key 180 is generated in the PLD 110. The key 180 is then used by the storage device 120 to encrypt the configuration data 130; thus, making copying of the configuration data 130 more difficult. In another embodiment, at least a portion of the configuration data 130 is encrypted by the software tools before being stored in the storage device 120 and the encryption circuit 125 further encrypts the already encrypted data. The security circuit 111 performs a complementary double decryption to generate the configuration data needed to program the configurable logic elements 118.

The storage device 120 is loaded with the configuration data 130. In one embodiment, the storage device 120 includes an EPROM with the additional encryption circuit 125. Importantly, in one embodiment, the encryption techniques used in the encryption circuit 125 are difficult to determine. To determine what techniques are being used, one would need to reverse engineer the storage device 120; a time consuming and difficult task. Other embodiments of the invention include other storage devices such as an EEPROM or a ROM. In one embodiment of the invention, the storage device 120 is replaced by a microprocessor that accesses the configuration data from a storage device (e.g., RAM, ROM) and encrypts the configuration data.

In still another embodiment of this invention, the security circuit 114 only generates the initialization data 202 (described below). The security circuit 114 transmits the initialization data 202 instead of the key 180 to the encryption circuit 125 and the decryption circuit 115.

In one embodiment, the security initialization circuit 114 pseudo-randomly generates multiple keys during the programming of the configurable logic elements 118. At intervals, the security initialization circuit 114 generates a new key 180. The new key 180 is then transmitted to the storage device 120. The new key 180 is then used to encrypt any configuration data 130 transmitted by the encryption circuit 125 until another new key 180 is received or until all of the stored configuration data 130 has been transmitted to the PLD 110 as the encrypted configuration data 135. In another embodiment, where the security circuit 114 does not transmit a key 180 to the storage device 120, the security circuit 114 periodically generates new initialization data for the encryption circuit and the decryption circuit. The new initialization data is then used to encrypt and decrypt the configuration data.

An Encryption Circuit

Figure 2:
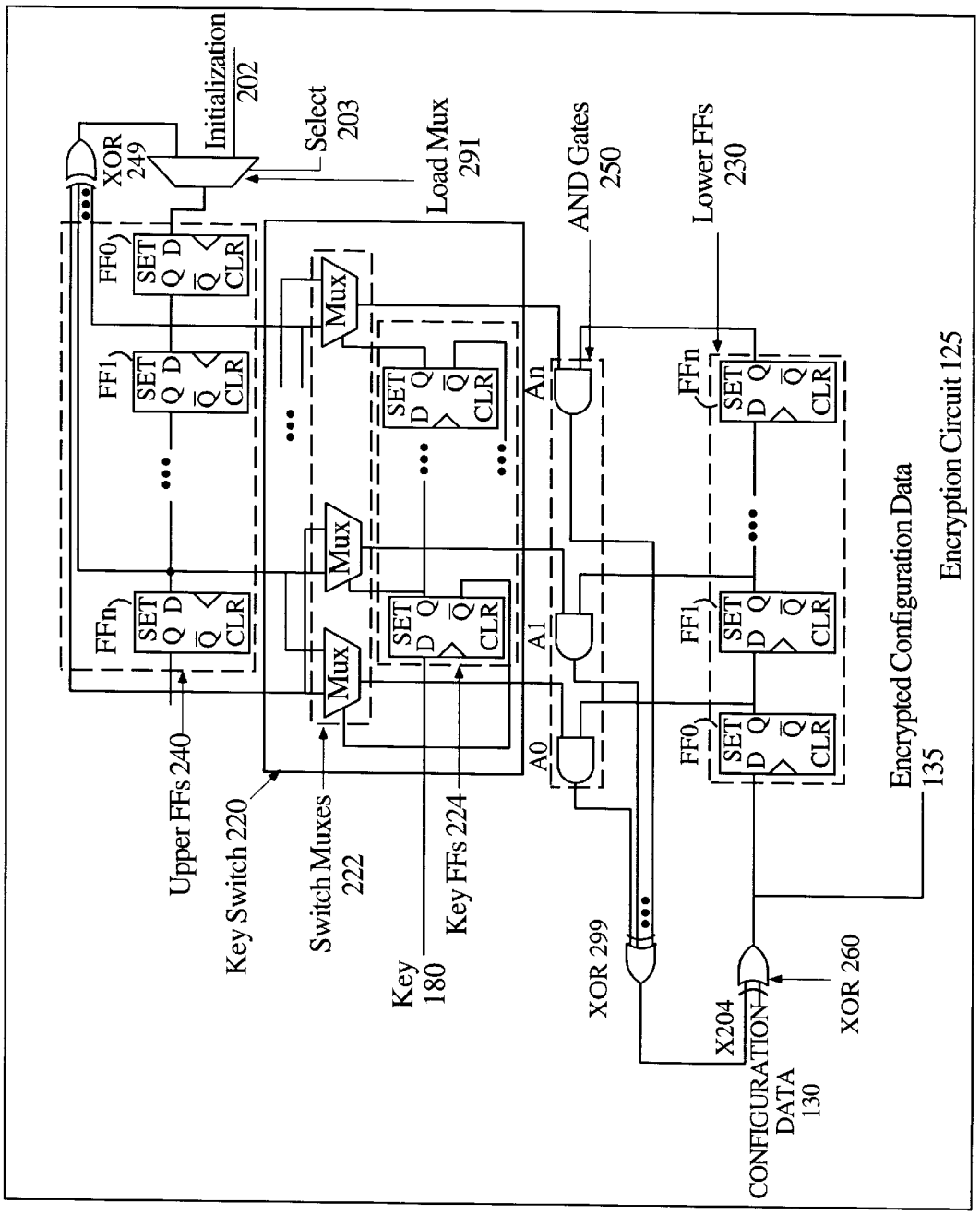
FIG. 2 illustrates an encryption circuit used in a storage device.

FIG. 2 illustrates an encryption circuit used in one embodiment of the invention. The encryption circuit 125 of FIG. 2 uses a relatively small number of gates and provides adequate protection. In the embodiment of FIG. 2, the relationship between a bit of the configuration data 130, D, and a bit of the encrypted configuration data 135, D*, is:

$$D \oplus X = D^* \quad \text{(EQ. 1)}$$

where $\oplus$ indicates an exclusive OR operation, X is a signal generated from one or more previous bits of the encrypted configuration data 135, D*old, and the key 180. Therefore, to decrypt D*, one need only perform the following operation:

$$D \oplus X = D, \quad \text{(EQ. 2)}$$

where X remains the same as in equation one.

The following paragraphs describe the elements in FIG. 2 and how they are connected. FIG. 2 includes an encryption circuit 125 having: upper flip-flops 240, a key switch 220, AND gates 250, lower flip-flops 230, XOR gate 260, XOR gate 299, XOR gate 249, and a load multiplexer 291. The configuration data 130 and the XOR'd outputs of the AND gates 250 (signal X204 from XOR gate 299) are connected to an input of the XOR gate 260. The output of the XOR 260 is the encrypted configuration data 135. The encrypted configuration data 135 is fed to the input of the lower flip-flops 230.

The lower flip-flops 230 include a number of D flip-flops. The first flip-flop has an input connected to receive the encrypted configuration data 135. The output of the first flip-flop is connected to the input of the second flip-flop. The second flip-flop's output is connected to third flip-flop, etc. Thus, the lower flip-flops 230 form a shift register. In one embodiment, the lower flip-flops 230 include eight D flip-flops. Other embodiments of the invention implement the shift register using different devices (e.g., T flip-flops). Each output of the lower flip-flops 230 is also connected to an input of a different AND gate of the AND gates 250.

The upper flip-flops 240 form a second shift register, similar to the shift register formed by the lower flip-flops 230. The outputs of some of the upper flip-flops 240 are fed back, through the XOR gate 249, into the an input of the load mux 291. The other input of the load mux 291 is connected to an initialization signal 202. A select signal 203 connects to the load mux 291 select input. A select signal 203 determines whether the load mux 291 causes a loading of the upper flip-flops 240, or a feeding back of the XOR'd outputs of the upper flip-flops 240. How many, and which outputs used as inputs in the XOR gate 249 help scramble the values generated by the upper flip-flops 240.

The key switch 220 also receives the output of the upper flip-flops 240 and provides additional inputs to the AND gates 250. The output of each upper flip-flop 240 is connected to two different switch muxes 222. The select lines of the switch muxes 222 are connected to an output of the key flip-flops 224. The key flip-flops 224 form a shift register for storing the key 180. Each output of each of the key flip-flops 224 is connected to the select inputs of two different switch muxes 222. Each output of each switch mux 222 is connected to an input of an AND gate 250. The patterns of the connections between the upper flip-flops 240, the key flip-flops 224, and the switch muxes 222 help encrypt the configuration data 130. The outputs of the AND gates 250 are XOR'd together (using XOR gate 299) to generate the signal X204. X204 is then XOR'd with the configuration data 130.

The following paragraphs describe the operation of the encryption circuit 125. Importantly, the encryption circuit 125 supports both an initialization procedure and an encryption procedure.

The initialization procedure prepares the encryption circuit 125 for encrypting the configuration data 130. That is, prior to beginning to encrypt the configuration data 130, the encryption circuit 125 is first initialized. In one embodiment of the invention, the upper flip-flops 240 are loaded with the initialization data 202 by asserting the select signal 203. The initialization data 202 defines the starting state of the upper flip-flops 240. Also as part of the initialization procedure, the key 180 is received and shifted into the key flip-flops 224. In one embodiment of the invention, the upper flip-flops 240 are set during the initialization procedure. The lower flip-flops 230 are reset during the initialization. In another embodiment, the lower flip-flops 230 and the upper flip-flops 240 are set to a predefined pattern of 1's and 0's.

After the initialization procedure, the encryption procedure then begins generating the encrypted configuration data 135. The key switch 220 output and the portion of the encrypted configuration data 135 stored in the lower flip-flops 230 are AND'ed in the AND gates 250. The output of the AND gates 250 is then XOR'd to generate a signal X204. Each new configuration data 130 bit is XOR'd with the signal X204 to generate a corresponding new encrypted configuration data 135 bit. The new encrypted configuration data 135 bit is shifted into the first flip-flop in the lower flip-flops 230.

The upper flip-flops 240 shift bits from the first flip-flop to the last flip-flop. The outputs of the upper flip-flops 240 determine the value fed back into the first flip-flop. The outputs are also used as the inputs to the switch muxes 222. Each switch mux 222 has two inputs from two different flip-flops in the upper flip-flops 240. Each switch mux 222 has a select line connected to one of the key flip-flops 224. Thus, the 1's and 0's in the key flip-flops 240 determine how the outputs of the upper flip-flops 240 are connected to the AND gates 250. A change in the key 180 value effectively changes the connections to the AND gates 250.

Table 1 illustrates an example set of encrypted configuration data 135 generated from the configuration data 130. In this example, there are three upper flip-flops 240, three lower flip-flops 230. The key is one bit long and connects the outputs of the middle flip-flops in the upper and lower flip-flops to the middle AND gate, connects the outputs of the last flip-flop in the upper flip-flops 240 to the same AND gate as the first flip-flop in the lower flip-flops 230, and vice-versa. Also, only the outputs of the last two upper flip-flops 240 are used as feedback to the first flip-flop. D is a bit in the configuration data 130. D* is the corresponding bit in the encrypted configuration data 135.

TABLE 1

| Upper Flip-Flops 240 | | | Lower Flip-Flops 230 | | | AND Gates 250 | | | X | D | D* |
|---|---|---|---|---|---|---|---|---|---|---|---|
| FF2 | FF1 | FF0 | FF2 | FF1 | FF0 | A2 | A1 | A0 | X | D | D* |
| 1 | 1 | 1 | 0 | 0 | 0 | 0 | 0 | 0 | 0 | 1 | 1 |
| 1 | 1 | 0 | 0 | 0 | 1 | 0 | 0 | 1 | 1 | 0 | 1 |
| 1 | 0 | 0 | 0 | 1 | 1 | 0 | 0 | 1 | 1 | 1 | 0 |
| 0 | 0 | 1 | 1 | 1 | 0 | 1 | 0 | 0 | 1 | 1 | 0 |
| 0 | 1 | 0 | 1 | 0 | 0 | 0 | 0 | 0 | 0 | 0 | 0 |
| 1 | 0 | 1 | 0 | 0 | 1 | 0 | 0 | 1 | 1 | 0 | 1 |
| 0 | 1 | 1 | 0 | 1 | 1 | 0 | 1 | 0 | 1 | 0 | 1 |
| 1 | 1 | 1 | 1 | 1 | 1 | 1 | 1 | 1 | 0 | 0 | 0 |

In one embodiment of the invention, the encryption circuit 125 does not include the upper flip-flops 240. In this embodiment, the key switch 220 is connected to the outputs of the lower flip-flops 230. Similar changes are made to the decryption circuit 115.

In another embodiment of the invention, the initialization data 202 is received at the input to a load mux 290. The other input to the load mux 290 is the encrypted configuration data 135 (the encrypted configuration data 135 is no longer connected directly to the first flip-flop in the lower flip-flops 230). The output of the load mux 290 is connected to the input of the first flip-flop in the lower flip-flops 230. The select signal 203 selects between the encrypted configuration data 135 or the initialization data 202. The initialization signal 202 is no longer connected to the load mux 291. The output of the last flip-flop in the lower flip-flops 230 is connected to the load mux 291 instead. Thus, the lower flip-flops 230 and the upper flip-flops 240 act as one long shift register when the select 203 signal is appropriately asserted. Thus, in this embodiment, the upper and lower flip-flops are loaded together during the initialization process.

In an embodiment of the invention where the security initialization circuit 114 does not transmit the key 180 to the storage device 120, the encryption circuit 125 operates as follows. The key switch 220 receives the key 180 from the storage area. In one embodiment, the key flip-flops 224 are replaced with the storage area devices. In any case, the key switch 220 includes the key 180. The select signal 203 is asserted to cause the upper and lower flip-flops to act as one long shift register. This long shift register is then loaded with the initialization 202 data. In one embodiment, the initialization data 202 is received from the PLD 110 (FIG. 1).

Decryption Circuit

Figure 3:
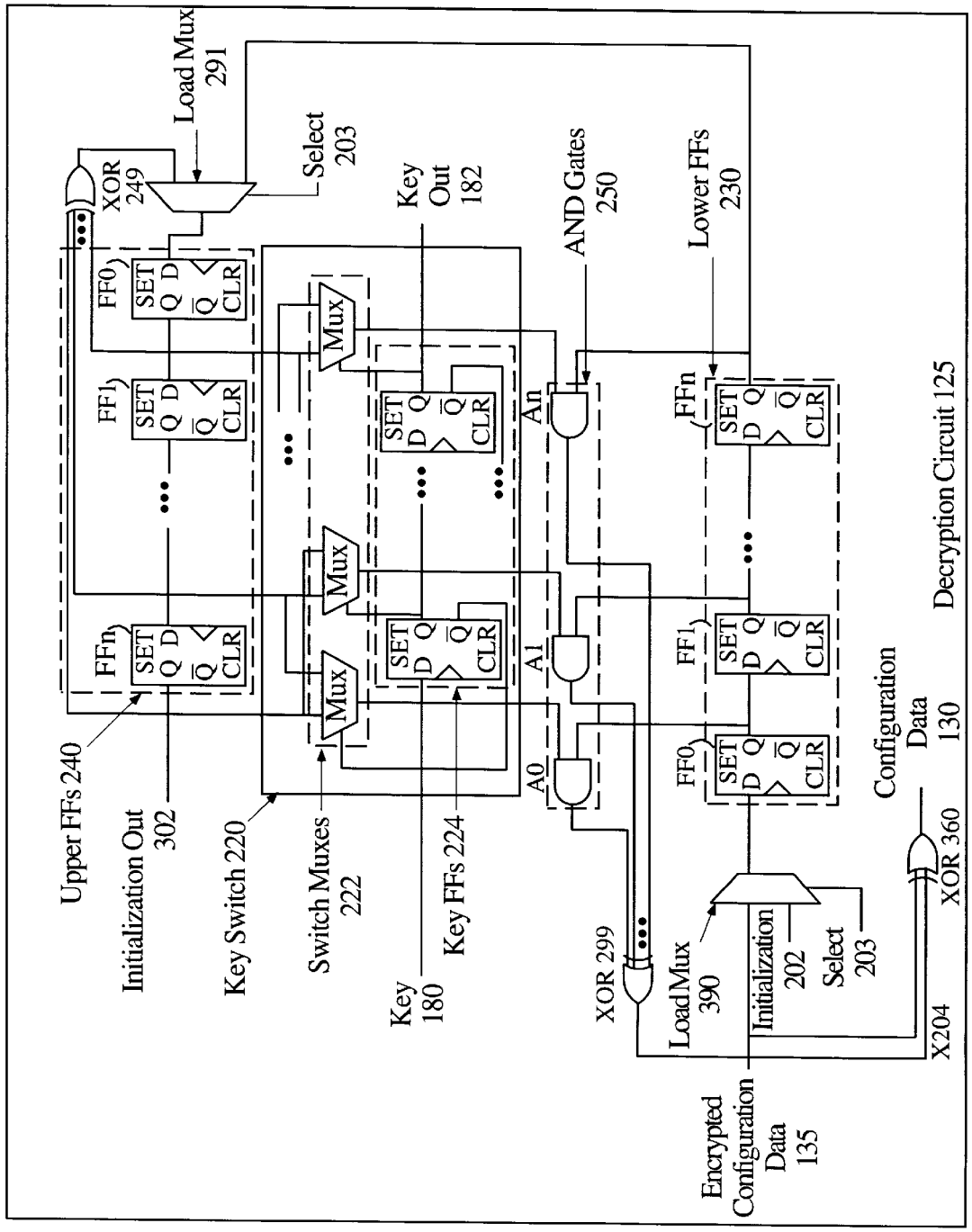
FIG. 3 illustrates a decryption circuit used in a programmable logic device.

FIG. 3 illustrates a decryption circuit used in a programmable logic device. The decryption circuit 115 of FIG. 3 uses a relatively small number of gates and provides adequate protection of the circuit design as implemented in the PLD.

The decryption circuit 115 is very similar to the encryption circuit 125. The similarity helps reduce the cost of designing the encryption and decryption circuits. (Note that the decryption circuit 115 is similar to the alternate embodiment having the load mux 290.) The following describes the differences between the two circuits. The element in the decryption circuit 115 not included in the encryption circuit 125 is the load multiplexer 390. The initialization signal 202 input of the load mux 291 has been changed to be the output of the last flip-flop in the lower flip-flops 230. The load mux 390 has one input connected to the encrypted configuration data 135 and the other input connected to the initialization data 202. Additionally, the XOR 260 is relabeled as XOR 360 to reflect that the operation being performed by the XOR 360 is different from the XOR 260 (i.e. D*⊕X=D instead of D⊕X=D*).

The pattern of the connections that connect the inputs of the switch muxes 222 to the outputs of the upper flip-flops 240 are the same as in the encryption circuit 125. Similarly, the connections to the XOR 249 from the upper flip-flops 240 must also be the same as in the encryption circuit 125. If these two conditions are not true, then the value of X204 may be different in the encryption circuit 125 than in the decryption circuit 115, resulting in a failure of the encryption and decryption scheme.

Importantly, as will be shown below, the addition of the load mux 390 and the change to one of the inputs of the load mux 291, allow the lower flip-flops 230 and the upper flip-flops 240 to act as one long shift register. By asserting the select signal 203, the output of the last flip-flop in the lower flip-flops 230 is fed to the input of the first flip-flop of the upper flip-flops 240. Thus, the initialization signal 202 can load all the bits in the both the upper and the lower flip-flops.

The following describes the operation of the decryption circuit 115. The decryption circuit 115 supports an initialization procedure and a decryption procedure. The initialization procedure causes the upper flip-flops 240 and the lower flip-flops 230 to be loaded with the values of the initialization signal 202. In another embodiment, the initialization procedure simply resets the lower flip-flops 230 and sets the upper flip-flops 240. In another embodiment, the lower flip-flops 230 and the upper flip-flops 240 are set to a predetermined pattern of 1's and 0's. The key 180 is also loaded into the key flip-flops 224. Importantly, the initial states of the key switch 220, the upper flip-flops 240 and lower flip-flops 230 in the encryption circuit 125 must be the same as the initial states of the key switch 220, the upper-flip-flops 240 and the lower flip-flops 230 in the decryption circuit 115. Otherwise, the decryption circuit 115 will not be able to decrypt the encrypted configuration data 135. During the decryption procedure, the encrypted configuration data 135 is received by the decryption circuit 115 and is XOR'd with the signal X204. The result of XOR'ing X204 and the encrypted configuration data 135 is the configuration data 130. The encrypted configuration data 135 is shifted through the lower flip-flops 230 to regenerate the same X204 as was generated in the encryption circuit 125.

Table 2 provides an example of decrypting the encrypted configuration data 135. The same set of conditions used to generate Table 1 are used to generate Table 2. Importantly, the configuration data D of Table 2 is the same as the configuration data D of Table 1.

TABLE 2

| Upper Flip-Flops 240 | | | Lower Flip-Flops 230 | | | AND Gates 250 | | | | | |
|---|---|---|---|---|---|---|---|---|---|---|---|
| FF2 | FF1 | FF0 | FF2 | FF1 | FF0 | A2 | A1 | A0 | X | D | D* |
| 1 | 1 | 1 | 0 | 0 | 0 | 0 | 0 | 0 | 0 | 1 | 1 |
| 1 | 1 | 0 | 0 | 0 | 1 | 0 | 0 | 1 | 1 | 1 | 0 |
| 1 | 0 | 0 | 0 | 1 | 1 | 0 | 0 | 1 | 1 | 0 | 1 |
| 0 | 0 | 1 | 1 | 1 | 0 | 1 | 0 | 0 | 1 | 0 | 1 |
| 0 | 1 | 0 | 1 | 0 | 0 | 0 | 0 | 0 | 0 | 1 | 1 |
| 1 | 0 | 1 | 0 | 0 | 1 | 0 | 0 | 1 | 1 | 1 | 0 |
| 0 | 1 | 1 | 0 | 1 | 1 | 0 | 1 | 0 | 1 | 1 | 0 |
| 1 | 1 | 1 | 1 | 1 | 1 | 1 | 1 | 1 | 0 | 0 | 0 |

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

I claim:

1. A method of communicating encrypted configuration data between a programmable logic device (PLD) and a storage device, the method comprising the following steps:

(a) storing original configuration data for the PLD in the storage device;

(b) pseudo-randomly generating a key in the PLD;

(c) transmitting the key from the PLD to the storage device;

(d) in the storage device, using the key, generating encrypted configuration data from the original configuration data stored in the storage device;

(e) transmitting the encrypted configuration data from the storage device to the PLD;

(f) decrypting the encrypted configuration data in the PLD using the key to generate a copy of the original configuration data; and (g) original configuring the PLD using the copy of the original configuration data produced by the decrypting step (f).

2. The method of claim 1 further comprising the additional steps of:

(h) pseudo-randomly generating and then transmitting a second key from the PLD at a second time to the storage device;

(i) generating additional encrypted configuration data in the storage device, using the second key, from the original configuration data stored in the storage device;

(j) transmitting the additional encrypted configuration data from the storage device to the PLD;

(k) decrypting the additional encrypted configuration data in the PLD using the second key to generate additional original configuration data; and (l) configuring the PLD using the additional original configuration data produced by the decrypting step (k).

3. The method of claim 1 wherein the encrypting step (d) in the storage device includes generating a bit of the encrypted configuration data, D*, from the original configuration data, D, using the relationship: $D \oplus X = D^*$, where $\oplus$ indicates an exclusive OR logical operation, and where X is a signal generated from at least one previous bit of the encrypted configuration data, D*old, and the key generated by the PLD.

4. The method of claim 3 wherein the decrypting step (f) includes generating a bit of the original configuration data, D, using the relationship: $D^* \approx X = D$.

5. The method of claim 3 wherein the encrypting step includes storing D*old in the storage device in one or more storage locations having outputs coupled to logic to generate X.

6. The method of claim 5 wherein the logic includes a second set of storage locations, and wherein the method further comprises the steps of:

generating a first value in the second set of storage locations;

in response to a value of the key, causing at least a first bit of the first value to be selectively communicated to at least a first logic gate;

at the first logic gate, performing a logic operation with the first bit and at least a bit from D*old to generate a first partial result; and generating X from at least the first partial result.

7. The method of claim 6 wherein the first logic gate includes an AND gate and wherein the first partial result is exclusively OR'd with a plurality of other partial results generated from other parts of the first value to generate X.

8. A method of communicating encrypted configuration data between a PLD and a storage device according to claim 1, wherein the steps (b) through (g) are repeated each time the PLD is to be configured, with a different key being generated each time.

9. An apparatus for programming a programmable logic device (PLD), comprising:

(a) a storage device external to the PLD, the data storage device including:

a configuration data storage memory in which unencrypted configuration data for configuring the PLD is stored;

an encryption circuit for encrypting the unencrypted configuration data stored in the configuration data storage memory in response to a key received from the PLD and transmitting encrypted configuration data to the PLD;

(b) a plurality of configurable logic elements within the PLD, the plurality of configurable logic elements being programmable with the configuration data to perform one or more functions of a desired circuit design;

(c) a security circuit within the PLD, the security circuit including:

a key generator for both pseudo-randomly generating a key and transmitting the key to the encryption circuit in response to an instruction to configure the PLD, and a decryption circuit, coupled to receive the key from the key generator and the encrypted configuration data from the encryption circuit, for generating unencrypted configuration data, the decryption circuit having a configuration data output coupled to program the plurality of configurable logic elements with the unencrypted configuration data in response to receiving the encrypted configuration data.

10. The apparatus for programming a PLD according to claim 9 wherein the decryption circuit includes a register for storing a portion of the encrypted configuration data, the portion of the encrypted configuration data being coupled to generate a bit of the unencrypted configuration data in response to receiving a second portion of the encrypted configuration data.

11. The apparatus for programming a PLD according to claim 10 wherein the decryption circuit includes:

a second register for storing the key and having a second key output for transmitting data stored in the second register, and an initialization state output for transmitting at least the key as stored in the second register.

12. The apparatus for programming a PLD according to claim 9, wherein the PLD includes a field programmable gate array, and wherein the configurable logic elements include a plurality of configurable logic blocks and a plurality of configurable input/output blocks.

* * * * *